(12) United States Patent
Bertelo et al.

(10) Patent No.: US 10,443,189 B2
(45) Date of Patent: *Oct. 15, 2019

(54) FIBERS SIZED WITH POLYETHERKETONEKETONES

(71) Applicant: Arkema Inc., King of Prussia, PA (US)

(72) Inventors: Christopher A. Bertelo, Doylestown, PA (US); Gregory S. O'Brien, Downingtown, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/013,996

(22) Filed: Jun. 21, 2018

(65) Prior Publication Data

US 2018/0298551 A1    Oct. 18, 2018

Related U.S. Application Data

(63) Continuation of application No. 15/598,611, filed on May 18, 2017, now Pat. No. 10,030,333, which is a continuation of application No. 14/452,657, filed on Aug. 6, 2014, now Pat. No. 9,657,437, which is a continuation of application No. 13/148,157, filed as application No. PCT/US2010/023129 on Feb. 4, 2010, now Pat. No. 8,829,108.

(60) Provisional application No. 61/150,129, filed on Feb. 5, 2009.

(51) Int. Cl.

| C08K 7/00 | (2006.01) |
|---|---|
| D06M 15/53 | (2006.01) |
| C08L 29/10 | (2006.01) |
| C08K 7/14 | (2006.01) |
| C08K 7/04 | (2006.01) |
| C08K 7/02 | (2006.01) |
| C08L 29/12 | (2006.01) |
| C03C 25/26 | (2018.01) |
| C08J 7/04 | (2006.01) |
| C08L 71/00 | (2006.01) |
| C09D 171/00 | (2006.01) |
| D06M 15/39 | (2006.01) |
| C08J 5/06 | (2006.01) |
| D06M 101/00 | (2006.01) |

(52) U.S. Cl.
CPC ............. *D06M 15/53* (2013.01); *C03C 25/26* (2013.01); *C08J 5/06* (2013.01); *C08J 7/047* (2013.01); *C08K 7/02* (2013.01); *C08K 7/04* (2013.01); *C08K 7/14* (2013.01); *C08L 29/10* (2013.01); *C08L 29/12* (2013.01); *C08L 71/00* (2013.01); *C09D 171/00* (2013.01); *D06M 15/39* (2013.01); C08G 2650/40 (2013.01); C08J 2371/00 (2013.01); D06M 2101/00 (2013.01); D06M 2200/40 (2013.01); Y10T 428/26 (2015.01); Y10T 428/27 (2015.01); Y10T 428/294 (2015.01); Y10T 428/2916 (2015.01); Y10T 428/2918 (2015.01); Y10T 428/2933 (2015.01); Y10T 428/2942 (2015.01); Y10T 428/2947 (2015.01); Y10T 428/2964 (2015.01); Y10T 428/2967 (2015.01); Y10T 428/2969 (2015.01); Y10T 428/31645 (2015.04); Y10T 442/2402 (2015.04)

(58) Field of Classification Search
CPC .. C03C 25/26; C08J 5/06; C08J 7/047; C08K 7/02; C08K 7/04; C08K 7/00; C08K 7/14; C08L 29/12; C08L 71/00; C09D 171/00
USPC ........................................................ 442/108
See application file for complete search history.

(56) References Cited

U.S. PATENT DOCUMENTS

| 3,065,205 A | 11/1962 | Bonner et al. |
|---|---|---|
| 3,441,538 A | 4/1969 | Marks et al. |
| 3,442,857 A | 5/1969 | Thornton et al. |
| 3,516,966 A | 6/1970 | Berr |
| 3,519,206 A | 7/1970 | Leaders |
| 3,666,612 A | 5/1972 | Angelo |
| 3,929,164 A | 12/1975 | Richter |
| 4,272,294 A | 6/1981 | Jaunarajs et al. |
| 4,359,501 A | 11/1982 | DiTullio |
| 4,704,448 A | 11/1987 | Brugel |
| 4,747,988 A | 5/1988 | Deeg |
| 4,816,556 A | 3/1989 | Gay |
| 4,820,571 A | 4/1989 | Searfass |
| 4,891,084 A | 1/1990 | Senior |
| 4,954,605 A | 9/1990 | Deeg |
| 4,992,485 A | 2/1991 | Koo et al. |
| 4,996,287 A | 2/1991 | Bloom |
| 5,034,157 A | 7/1991 | Merrell et al. |
| 5,049,340 A | 9/1991 | Moss et al. |
| 5,124,413 A | 6/1992 | Luise |

(Continued)

FOREIGN PATENT DOCUMENTS

| CA | 2023864 | 8/1990 |
|---|---|---|
| EP | 0 374 593 A1 | 6/1990 |

(Continued)

OTHER PUBLICATIONS

Opposition Against European Patent 2 393 856 (10739093.2) Solvay OPP 2016/015—pp. 1-20.

(Continued)

*Primary Examiner* — Hannah J Pak

(74) *Attorney, Agent, or Firm* — Lynn B. Morreale

(57) ABSTRACT

Fibers sized with a coating of amorphous polyetherketoneketone are useful in the preparation of reinforced polymers having improved properties, wherein the amorphous polyetherketoneketone can improve the compatibility of the fibers with the polymeric matrix.

8 Claims, 1 Drawing Sheet

(56) References Cited

U.S. PATENT DOCUMENTS

| | | | |
|---|---|---|---|
| 5,130,408 A | 7/1992 | Deeg | |
| 5,198,281 A | 3/1993 | Muzzy et al. | |
| 5,238,725 A | 8/1993 | Effing et al. | |
| 5,260,104 A | 11/1993 | Bryant | |
| 5,290,906 A | 3/1994 | Matsumura et al. | |
| 5,300,122 A | 4/1994 | Rodini | |
| 5,357,040 A | 10/1994 | McGrath et al. | |
| 5,409,757 A | 4/1995 | Muzzy et al. | |
| 5,470,639 A | 11/1995 | Gessner et al. | |
| 5,601,893 A | 2/1997 | Strassel et al. | |
| 5,667,146 A | 9/1997 | Pimentel et al. | |
| 5,730,188 A | 3/1998 | Kalman et al. | |
| 5,844,036 A | 12/1998 | Hughes | |
| 5,997,898 A | 12/1999 | Gessner et al. | |
| 6,004,160 A | 12/1999 | Korsunsky et al. | |
| 6,132,872 A | 10/2000 | McIntosh et al. | |
| 6,177,518 B1 | 1/2001 | Lahijani | |
| 6,251,809 B1 | 6/2001 | Creasy | |
| 6,383,623 B1 | 5/2002 | Erb, Jr. | |
| 6,668,866 B2 | 12/2003 | Glejbol et al. | |
| 6,773,773 B2 | 8/2004 | Hauber | |
| 6,857,452 B2 | 2/2005 | Quigley et al. | |
| 6,978,806 B2 | 12/2005 | Glejbol et al. | |
| 7,055,551 B2 | 6/2006 | Fraser et al. | |
| 7,302,973 B2 | 12/2007 | Glejbol et al. | |
| 8,829,108 B2 * | 9/2014 | Bertelo | C03C 25/26 524/592 |
| 9,422,654 B2 * | 8/2016 | Rudman | C08L 71/00 |
| 9,657,437 B2 * | 5/2017 | Bertelo | C03C 25/26 |
| 10,030,333 B2 * | 7/2018 | Bertelo | C03C 25/26 |
| 2003/0032339 A1 | 2/2003 | Bell et al. | |
| 2003/0047317 A1 | 3/2003 | Powers | |
| 2005/0181203 A1 | 8/2005 | Rawlings et al. | |
| 2006/0240967 A1 | 10/2006 | Hojaji et al. | |
| 2007/0036925 A1 | 2/2007 | Braad | |
| 2007/0066741 A1 | 3/2007 | Donovan et al. | |
| 2007/0106006 A1 | 5/2007 | Cooper et al. | |
| 2007/0142569 A1 | 6/2007 | Donovan et al. | |
| 2007/0148457 A1 | 6/2007 | Wagner et al. | |
| 2007/0121296 A1 | 9/2007 | Keep | |
| 2007/0243762 A1 | 10/2007 | Burke et al. | |
| 2008/0009903 A1 | 1/2008 | Schmieding et al. | |
| 2008/0063847 A1 | 3/2008 | Chang et al. | |
| 2008/0139065 A1 | 6/2008 | Amarasekera et al. | |
| 2008/0190507 A1 | 8/2008 | Hardy | |
| 2008/0248201 A1 | 10/2008 | Corkey et al. | |
| 2008/0255647 A1 | 10/2008 | Jensen et al. | |
| 2008/0312387 A1 | 12/2008 | El-Hibri et al. | |
| 2009/0242104 A1 | 10/2009 | Watanabe | |
| 2012/0028036 A1 * | 2/2012 | Bertelo | B32B 5/02 428/332 |

FOREIGN PATENT DOCUMENTS

| | | |
|---|---|---|
| WO | WO 2006/135597 A1 | 12/2006 |
| WO | WO 2008/113362 | 9/2008 |
| WO | WO 2008/119677 | 10/2008 |
| WO | WO 2008/14772 A1 | 12/2008 |
| WO | WO 2010/072975 A1 | 7/2010 |
| WO | WO2010/085419 | 7/2010 |
| WO | WO 2010/088638 | 8/2010 |
| WO | WO 2010/088639 | 8/2010 |
| WO | WO 2010/091136 | 8/2010 |
| WO | WO 2010/107976 | 9/2010 |
| WO | WO 2010/111335 | 9/2010 |

OTHER PUBLICATIONS

Structure, crystallization and morphology of poly (aryl ether ketone ketone)* Garnder, KennCorwin H., et al—Central R&D Fibers & Polymers, E.I. Dupont de Nemours, Experimental Station, Wilmington, Delaware 1988-0356 USA; Polymer 1992, vol. 33, No. 12, pp. 2483-2495.

* cited by examiner

Cryrofracturing of glass filled PEKK (left) and PEEK (right) composite samples
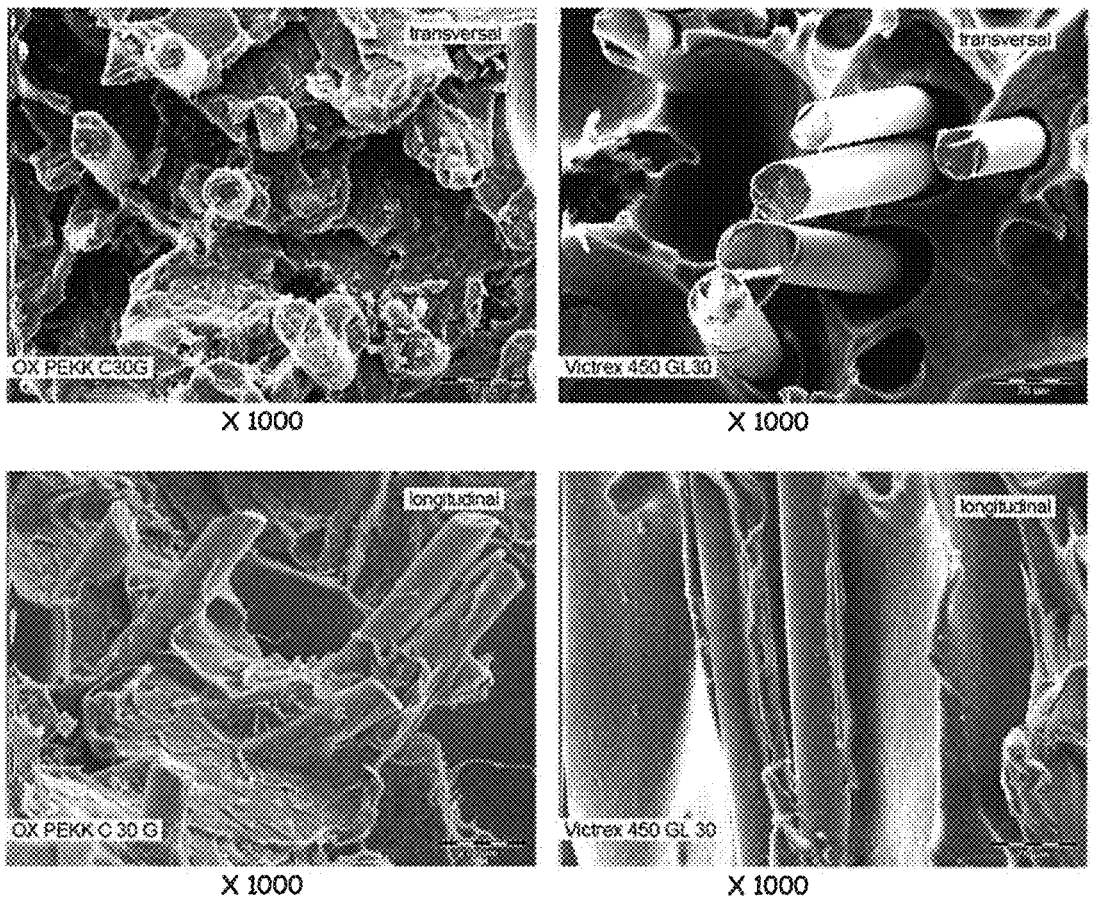

FIBERS SIZED WITH POLYETHERKETONEKETONES

CROSS-REFERENCE TO RELATED APPLICATIONS

This application is a continuation of U.S. application Ser. No. 15/598,611, filed May 18, 2017 which is a continuation of U.S. application Ser. No. 14/452,657, filed Aug. 6, 2014, now U.S. Pat. No. 9,657,437, granted May 23, 2017 which is a continuation of U.S. application Ser. No. 13/148,157, filed Aug. 16, 2011, now U.S. Pat. No. 8,829,108, granted Sep. 9, 2014, which is a national stage application under 35 U.S.C. § 371 of PCT/US2010/023129, filed Feb. 4, 2010, which claims benefit to U.S. Provisional Application No. 61/150,129, filed on Feb. 5, 2009.

FIELD OF THE INVENTION

The invention relates to fibers sized with a coating of amorphous polyetherketoneketone as well as reinforced polymers that include such sized fibers.

DISCUSSION OF THE RELATED ART

Various chemical treatments exist for the surfaces of fibers such as glass fibers and carbon fibers to aid in their handling, improve processability for compounding and downstream processes such as injection molding, and improve strength and other properties for specific end-use applications. Before bundling the filaments together after formation, a coating composition or sizing composition is applied to at least a portion of the surface of the individual filaments to protect them from abrasion and to assist in processing. Sizing compositions may provide protection through subsequent processing steps, such as those where the fibers pass by contact points as in the winding of the fibers and strands onto a forming package, drying the aqueous-based or solvent-based sizing composition to remove the water or solvent (if the sizing has been applied to the fibers using a solution), twisting from one package to a bobbin, beaming to place the yarn onto very large packages ordinarily used as the warp in a fabric, chopping in a wet or dry condition, roving into larger bundles or groups of strands, unwinding for use as a reinforcement, and other downstream processes.

In addition, sizing compositions can play a dual role when placed on fibers that reinforce polymeric matrices in the production of fiber-reinforced plastics. In such applications, the sizing composition provides protection and also can provide compatibility between the fiber and the matrix polymer or resin. For instance, fibers in the forms of woven and nonwoven fabrics and mats, rovings and chopped strands have been used with resins, such as thermosetting and thermoplastic resins, for impregnation by, encapsulation by, or reinforcement of the resin. In such applications, it is desirable to maximize the compatibility between the surface and the polymeric resin while also improving the ease of processability and manufacturability. However, many polymeric resins, especially highly crystalline engineering thermoplastics such as crystalline polyaryletherketones, do not exhibit good adhesion to various fiber surfaces. Poor adhesion at the interface between the fiber surface and the polymeric resin matrix makes it difficult to take full advantage of the property improvements potentially realizable through incorporation of the fibers into such matrices. Additionally, many of the sizing compositions that have been developed to date have unsatisfactory stability at the high processing temperatures typically required to admix fibers into engineering thermoplastics.

Accordingly, it would be desirable to develop alternative approaches to enhance the compatibility of engineering thermoplastics and the like with fibers of various types so that composites having improved properties can be obtained.

BRIEF SUMMARY OF THE INVENTION

The present invention provides a sized fiber comprising a fiber having a coating of amorphous polyetherketoneketone, as well as a method of making a sized fiber comprising coating a fiber with amorphous polyetherketoneketone. In another aspect, the invention provides a reinforced polymer comprising a polymer matrix and sized fibers comprising fibers having a coating of amorphous polyetherketoneketone.

BRIEF DESCRIPTION OF THE DRAWINGS

FIG. 1 Shows micrographs of fibers sized with PEKK and PEEK, and demonstrates the failure mode in fibers of each sizing.

DETAILED DESCRIPTION OF CERTAIN EMBODIMENTS OF THE INVENTION

Sized fibers in accordance with the present invention are advantageously manufactured by coating fibers with a polymeric composition comprised of an amorphous (non-crystalline) polyetherketoneketone.

The amorphous polyetherketoneketones suitable for use in the present invention comprise (and preferably consist essentially of or consist of) repeating units represented by the following Formulas I and II:

-A-C(=O)—B—C(=O)—    I

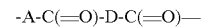

-A-C(=O)-D-C(=O)—    II where A is a p,p'-Ph-O-Ph- group, Ph is a phenylene radical, B is p-phenylene, and D is m-phenylene. The Formula I:Formula II (T:I) isomer ratio in the polyetherketoneketone is selected so as to provide an amorphous polymer. An amorphous polymer, for purposes of this invention, means a polymer that does not exhibit a crystalline melting point by differential scanning calorimetry (DSC).

Polyetherketoneketones are well-known in the art and can be prepared using any suitable polymerization technique, including the methods described in the following patents, each of which is incorporated herein by reference in its entirety for all purposes: U.S. Pat. Nos. 3,065,205; 3,441, 538; 3,442,857; 3,516,966; 4,704,448; 4,816,556; and 6,177,518. Mixtures of polyetherketoneketones may be employed.

In particular, the Formula I:Formula II ratio (sometimes referred to in the art as the T/I ratio) can be adjusted as desired by varying the relative amounts of the different monomers used to prepare the polyetherketoneketone. For example, a polyetherketoneketone may be synthesizing by reacting a mixture of terephthaloyl chloride and isophthaloyl chloride with diphenyl ether. Increasing the amount of terephthaloyl chloride relative to the amount of isophthaloyl chloride will increase the Formula I:Formula II (T/I) ratio. Generally speaking, a polyetherketoneketone having a relatively high Formula I:Formula II ratio will be more crystalline than a polyetherketoneketone having a lower Formula I:Formula II ratio. An amorphous polyetherketoneketone having a T/I ratio of from about 55:45 to about 65:35 is particularly suitable for use in the present invention.

Suitable amorphous polyetherketoneketones are available from commercial sources, such as, for example, certain of the polyetherketoneketones sold under the brand name OXPEKK by Oxford Performance Materials, Enfield, Conn., including OXPEKK-SP polyetherketoneketone.

The polymeric composition used as a fiber sizing may additionally be comprised of components other than the amorphous polyetherketoneketone, such as stabilizers, pigments, processing aids, fillers, and the like. If the sizing is to be applied to the fibers in solution form, such additional components should preferably be soluble in the solvent or mixture of solvents employed. In certain embodiments of the invention, the polymeric composition consists essentially of or consists of amorphous polyetherketoneketone. For example, the polymeric composition may be free or essentially free of any type of polymer other than amorphous polyetherketoneketone.

The present invention is useful in connection with any type of fiber, but particularly fibers that are to be used as reinforcements or fillers in polymeric matrices. Suitable fibers include, for example, glass fibers, carbon fibers, polymeric fibers, metallic fibers, mineral (ceramic, inorganic) fibers and the like. Glass fibers (fiberglass) may be obtained from any type of glass, e.g., A glass, E glass, S glass, or D glass. Carbon fibers (which include graphite fibers) are typically prepared by pyrolysis of organic or polymeric fibers (such as PAN). Polymeric fibers include fibers made from any of the known types of thermoplastic polymers such as polyamides, polyolefins, polyaramids, polyesters, poly(p-phenylene-2,6-benzobisoxazole)(PBO), and the like. Suitable metallic fibers include fibers prepared using any type of metal or metal alloy, such as iron, steel, aluminum, aluminum alloys, copper, titanium, nickel, gold, silver and the like. Mineral fibers that can be used in the present invention are fibers made from natural or synthetic minerals, refractory oxides or metal oxides and include, but are not limited to, mineral wool, rock wool, stone wool, basalt fibers, alumina fibers, beryllia fibers, magnesia fibers, thoria fibers, zirconia fibers, silicon carbide fibers, quartz fibers, boron fibers, asbestos fibers and high silica fibers and the like. Fibers of any diameter or length may be sized with a coating of amorphous polyetherketoneketone in accordance with the present invention. For example, the fiber may be from 1 micron to 1 mm in diameter. Typically, the fiber is many times longer than its diameter. For example, the fiber length may be at least 10, 100, 1000 or 10,000 times the fiber diameter.

In one embodiment of the invention, the amorphous polyetherketoneketone is applied to the fiber as a sizing composition comprised of the polyetherketoneketone and a suitable solvent or mixture of solvents and the solvent or solvent mixture then removed by drying so as to deposit a relatively thin coating of the polyetherketoneketone on the fiber surface. Any substance capable of dissolving the polyetherketoneketone may be utilized as the solvent, including, for example, halogenated (preferably, chlorinated) organic compounds such as o-dichlorobenzene, 1,2-dichloroethane, dichloromethane (methylene chloride), alpha-chloronaphthalene and tetrachloroethylene. Other suitable solvents may include benzophenone, diphenylsulfone, 2-phenylphenol, p-methoxyphenol, 2-methoxynaphthalene, ethyl-4-hydroxybenzoate, N-cyclohexyl-2-pyrrolidone, pentafluorophenol, dimethylphthalate, nitrobenzene and phenyl benzoate. Aqueous mineral acids (e.g., sulfuric acid and/or nitric acid) are examples of other solvents that could be used for this purpose. In one embodiment of the invention, the amorphous polyetherketoneketone is synthesized in a suitable solvent and the resulting polymerization reaction product used as the sizing composition (thereby avoiding the need to isolate the polyetherketoneketone from the polymerization reaction mixture and then redissolve it). The solvent should be selected based on its compatibility with the fibers that are to be sized in accordance with the present invention. For example, the solvent should not dissolve or degrade the fibers.

The amorphous polyetherketoneketone preferably forms a relatively thin coating on the fiber surface. For example, the polyetherketoneketone coating may be from about 1 to about 50 microns thick. In one embodiment of the invention, the fiber surfaces are completely covered by the polyetherketoneketone coating, although in other embodiments certain portions of the fiber surfaces remain uncoated. Typically, the amorphous polyetherketoneketone coating may comprise from about 0.01 to about 10% by weight of the sized fibers.

The fiber may be in the form of individual filaments, twisted yarns, threads, strands, rovings, mats, meshes, scrims or a fabric (woven or non-woven) at the time it is sized with the amorphous polyetherketoneketone. After sizing, the fibers may be further processed (e.g., individual filaments may be sized and the sized filaments then converted into yarns, threads, strands, rovings, mats, meshes, scrims, woven fabric, non-woven fabric and the like). In one embodiment, the fiber is in continuous form (e.g., an unbroken filament, thread, strand or yarn) at the time it is sized, but then converted into discontinuous form by cutting, chopping or other such operation. The discontinuous sized fibers may, for example, be from about 0.5 to about 20 mm in length. The sized fibers may be used, in continuous or discontinuous form, in the manufacture of fiber reinforced composites.

Means for applying the sizing composition include, but are not limited to, pads, sprayers, rollers or immersion baths, which allow a substantial amount of the surfaces of the individual filaments of the fiber to be wetted with the sizing composition. The sizing composition may be applied to the fibers by dipping, spraying, roll coating, extruding, pultrusion, or the like. In one embodiment, the sizing composition is applied to the fibers continuously.

If solvent is present in the sizing composition, the solvent is removed after the sizing composition is applied to the fiber. The solvent may be removed by heating the fiber to evaporate the solvent, by allowing the solvent to evaporate at ambient temperature and pressure and/or by subjecting the fiber to vacuum. When the solvent is removed by heating, the temperature will vary depending on the types of solvent and fiber used. The solvent may be removed continuously, for example, by passing the fiber through a heater, such as a tube furnace. The time required to remove the solvent will vary depending on the temperature and the solvent, however, the time required is typically several seconds to several hours, preferably 10 to 20 seconds. If an acidic solution has been used, the fibers may be passed through water to remove residual acid (extractive dilution) or passed through a basic solution to remove and/or neutralize residual acid.

Although sized fibers in accordance with the present invention can be combined with or compounded into any type of polymeric matrix, including thermoplastic or thermosettable polymeric matrices, they are particularly useful where it is desired to provide fiber reinforcement to a polymeric matrix comprised, consisting essentially of, or consisting of a crystalline and/or high temperature thermoplastic as these materials often exhibit interfacial adhesion to various types of fiber surfaces that is not completely satisfactory. A sizing of amorphous polyetherketoneketone on the fiber in accordance with the present invention helps to improve such adhesion, thereby enhancing the mechanical and other properties of the resulting composite. Suitable crystalline and/or high temperature thermoplastics include, but are not limited to, polyaryletherketones (such as crystalline polyetherketone (PEK), crystalline polyetheretherketone (PEEK), crystalline polyetherketoneketone (PEKK), polyetheretheretherketone (PEEEK), polyetheretherketoneketone (PEEKK), polyetherketoneetheretherketone (PEKEKK), and polyetherketoneketoneketone (PEKKK)), polyimides, polyetherimides, polyamideimides, polysulfones, polyethersulfones, polyarylethers, polycarbonates, liquid crystal polymers, polyphenylene sulfides, polyarylenes (polyphenylenes), polyamides, polyphthalamides, polyaromatic esters and the like.

In one embodiment of the invention, chopped fibers sized with amorphous polyetherketoneketone may be mixed with a polymeric resin and supplied to a compression- or injection-molding machine to be formed into fiber-reinforced composites. Typically, the chopped fibers are mixed with pellets of a thermoplastic polymer resin in an extruder. For example, polymer pellets can be fed into a first port of a twin screw extruder and the chopped sized fibers then fed into a second port of the extruder with the melted polymer to form a fiber/resin mixture. Alternatively, the polymer pellets and chopped fibers can be dry mixed and fed together into a single screw extruder where the resin is melted and the fibers are dispersed throughout the molten resin to form a fiber/resin mixture. Next, the fiber/resin mixture is degassed and formed into pellets. The fiber/resin pellets can then be fed to a molding machine and formed into molded composite articles that have a substantially homogeneous dispersion of fibers throughout the composite article.

The sized fibers of the present invention may also be used in long-fiber thermoplastic applications. Fiber-reinforced thermoplastic polymer structural components can be manufactured from long fiber thermoplastic (LFT) granulates (pellets), glass mat thermoplastic (GMT) sheets, or pultruded sections wherein the fibers have been sized with amorphous polyetherketoneketone. Long fiber-reinforced granulates can comprise sized fiber bundles encapsulated with a thermoplastic through a cable coating or a pultrusion process. The LFT granulates, which contain fibers equal in length to the pellet, e.g., 1 to 25 mm, can be injection molded, but can also be extrusion compression molded in order to preserve fiber length in the finished product.

Polymer components reinforced with sized fibers in accordance with the present invention may also be manufactured using continuous in-line extrusion methods known in the art. Such methods involve the plastication of a polymer in a first single screw extruder from which the output is fed to a second single screw extruder. Fibers are introduced in the polymer melt in the second extruder, either in chopped-segmented form or as continuous strands under a predetermined tension. The fiber-reinforced polymer is fed into an accumulator and then applied automatically or in a separate step to a compression molding tool wherein the fiber-reinforced polymer is shaped as required for a particular application. Alternatively, the fiber-reinforced polymer may be continuously extruded onto a conveyor and sectioned thereupon. The conveyor delivers the sectioned fiber-reinforced polymer to a placement assembly which removes the sectioned material from the conveyor and places the material upon the compression molding tool.

The process of compounding and molding the sized reinforcing fiber and the matrix resin to form a composite may be accomplished by any means conventionally known in the art. Such compounding and molding means include, but are not limited to, extrusion, wire coating, blow molding, compression molding, injection molding, extrusion-compression molding, extrusion-injection-compression molding, long fiber injection, and pushtrusion.

The orientation of the sized fibers within the polymeric matrix of the composite produced in accordance with the present invention may be varied and controlled as desired using the techniques known to those skilled in the field. For example, the fibers may be continuous and aligned, or discontinuous and aligned, or discontinuous and randomly oriented.

The amount of fiber included in the composite is generally about 1% to about 90% by weight, based on the total weight of the composite formulation.

The amorphous polyetherketoneketone provides a coating on the reinforcing fibers that improves compatibility and adhesion with the resin matrix, and results in composites with more desirable properties such as higher short-term and long-term mechanical properties.

Reinforced polymers prepared in accordance with the present invention may be utilized in any of the end use applications where such materials conventionally are employed or have been proposed to be employed. Representative applications include composites for aerospace/aircraft, automobiles and other vehicles, boats, machinery, heavy equipment, storage tanks, pipes, sports equipment, tools, biomedical devices (including devices to be implanted into the human body, such as load-bearing orthopedic implants), building components, and the like. Benefits of the invention described herein include higher tensile strength, higher compressive strength, improved resistance to crack initiation and propagation, greater creep resistance, and higher resistance to attack by various chemicals and solvents, as compared to reinforced polymers prepared using fibers that are not sized with amorphous polyetherketoneketone.

Fiber-reinforced composites in accordance with the present invention can, for example, be used to prepare laminar panels that are stacked and bonded to each other or can be used as face sheets in the production of sandwich panels having honeycomb or foamed cores.

EXAMPLES

Example 1

Sizing a fiber from a solution—A solution of an amorphous grade of Polyetherketoneketone (A-PEKK) such as OXPEKK SP from Oxford Performance materials) with a high ratio of isophthalate (T/I=55-45 to 65-35 but most preferably 60/40) is produced by dissolving XX gm of PEKK in 100 gm of concentrated sulfuric acid. The solution is placed in a bath of suitable construction so as not to react with the strong mineral acid and a glass fiber yarn made from a group of fibers is passed through the bath so as to produce a fairly even coating of the solution. The acidic solution is then neutralized or simply diluted by passage through a second bath containing a basic solution or just water. The act of neutralizing or diluting the solution thus renders the polymer insoluble and leaves a coating of the polymer on the fiber.

Example 2

Sizing the fiber by powder coating and heating—A fine powder is produced from an amorphous grade of A-PEKK, as described in example 1, and used to powder coat a metal fiber. Two general methods can be employed for the powder coating. In the first, an electrostatic spray of the fine powder is applied to the fiber just prior to the fiber entering an oven heated to a temperature such that the A-PEKK melts (c.a 320° C.) and forms a generally continuous coating on the fiber. Alternatively the fiber can be heated prior to entering a fluidized bath containing the fine A-PEKK powder. More details on specific powder coating methods can be found in references such as: Powder Coating. The Complete Finisher's Handbook, 1997, Powder Coating Inst., ISBN: 0964309106 or Organic Coatings: Science and Technology (Society of Plastics Engineers Monographs) (Vol 2), Z. W. Wicks Jr, Frank N. Jones and S. P. Pappas (Authors). For the application described here there is no need for an impermeable A-PEKK coating but rather only a reasonably complete layer of A-PEKK needs to be applied.

Example 3

Sizing Woven Mats—Complete woven, or otherwise formed mats of metal or glass strands can be sized after production by passing the preformed mat or cloth through the solution described in example 1 or by powder coating as described in example 2.

Example 4

Incorporation of the A-PEKK sized fibers into a matrix—The A-PEKK sized fibers can be incorporated into an article by any manner of polymer processing. Chopped fiber is routinely incorporated by compounding the fiber into a polymer using a twin screw extruder and continuous fiber incorporation can be accomplished by pultrusion etc. As the A-PEKK sizing is compatible with a variety of other high temperature polymer matrices and PEKK has very good adhesion properties the A-PEKK sizing can diffuse into the matrix promoting incorporation or dispersion of the fibers within the matrix polymer and improve the adhesion of the fibers to the matrix. The pictures of FIG. 1 illustrate the adhesion developed by PEKK to a glass fiber vs. that developed by another high temperature polymer, in this case polyetheretherketone PEEK. As the picture illustrates the failure in the PEKK composite is cohesive as the failure is in the PEKK matrix. The fracture surface in this case shows significant ductility produced as a consequence of the effective load transfer between the PEKK and the PEKK matrix. In contrast, the failure in the PEEK system is adhesive as the fibers are cleanly pulled from the matrix. The fractured surface shows a clean brittle rupture process, indicating that in this case the interaction of the fiber with the matrix is not as effective. Load transfer is not expected to be efficient in this system. The energy of breaking a piece by cohesive failure is dependant on the strength of the matrix itself and is generally regarded as higher than an adhesive failure.

What is claimed is:

1. A sized fiber comprising a continuous or discontinuous carbon or graphite fiber having a polymeric coating composition comprising amorphous polyetherketoneketone, said coating optionally comprising stabilizers, pigments, processing aids, and/or fillers, and having a thickness of about 1 micron to about 50 microns, wherein said coating surrounds said fiber, and wherein the amorphous polyetherketoneketone is comprised of repeating units represented by formulas I and II:

    I

    II wherein A is a p,p'-Ph-O-Ph- group, Ph is a phenylene radical, B is p-phenylene, and D is m-phenylene and the isomer ratio of formula I:formula II (T:I) ranges from about 55:45 to about 65:35.

2. The sized fiber of claim 1, wherein said fiber is a monofilament.

3. The sized fiber of claim 1, wherein said fiber is a multifilament.

4. The sized fiber of claim 1, wherein said fiber has a diameter of 1 micron to 1 mm.

5. A reinforced polymer comprising a polymer matrix and the one or more sized fibers of claim 1.

6. The reinforced polymer of claim 5, wherein said polymer matrix is comprised of a thermoplastic selected from the group consisting of crystalline polyetherketone (PEK), crystalline polyethretherketone (PEEK), crystalline polyetherketoneketone (PEKK), polyetherethertherketone (PEEEK), polyetheretherketoneketone (PEEKK), polyetherketoneetheretherketone (PEKEEK), and polyetherketoneketoneketone (PEKKK), polyimides, polyetherimides, polamideimides, polysulfones, polyethersulfones, polyarylethers, polycarbonates, polyphenylene sulfides, polyarylenes (polyphenylenes), polyamides, polyphthalamides, and polyaromatic esters.

7. The reinforced polymer of claim 5, where said polymer matrix is comprised of a crystalline poly(aryletherketone).

8. A fiber-reinforced composite comprising one or more sized fiber of claim 1.

* * * * *